Jan. 8, 1957.  H. R. ORTEGA  2,777,100

RECTIFIER DEVICE

Filed Jan. 3, 1956

INVENTOR.

HUGH R. ORTEGA.

BY [signature]

ATTORNEY

United States Patent Office 2,777,100

Patented Jan. 8, 1957

2,777,100

RECTIFIER DEVICE

Hugh R. Ortega, Hollis, N. Y., assignor of one-half to Morris Bookstein, New York, N. Y.

Application January 3, 1956, Serial No. 556,946

11 Claims. (Cl. 317—234)

This invention relates to dry cell rectifier assemblies, such as those made with selenium coatings.

Rectifier stacks employing a plurality of center-hole plates commonly have a central post associated with clamping and holding components to create a unitary structure. In conventional devices of this category various expedients are employed to give rigidity of the stack, particularly to prevent a rotational shifting of plates—such expedients frequently involving the use of complex clamping and spacer elements. Such devices are not only costly, but often comparatively heavy, and hence are neither of the desired practicability for handling nor foı use in cooperation with electrical units where lightness is important. In certain conventional structures it is frequently necessary, in order to effect a rigid assembly, as well as to assure firm contact between the conductive spacers and opposing plate electrodes, to employ a clamping force of considerable magnitude, with the danger of damage to the active rectifier surface, such as to the selenium crystal layers used on rectifier plates. Furthermore, due to the relatively small contact areas that generally prevail between the conductive spacers and the opposing surfaces of the plates in conventional devices, there is developed considerable heat at the regions of contact, thereby requiring in many instances the use of costly and space-consuming elements with fins or other radiating members for the purpose of accelerating the dissipation of such heat.

It is within the contemplation of my invention to provide a rectifier device with center-hole plates having none of the aforesaid disadvantages. Specifically, it is one of my objectives to provide a rectifier assembly that is light in weight, and that employs conductive elements between adjacent plates providing relatively large contact areas, whereby the device will be relatively cool and will require relatively little pressure between the conductive elements and the plates. In connection with this aspect of my invention, it is a further object thereof to provide an arrangement of spacer members which will permit the employment of considerable holding stress applied to the plates of the stack for producing a rigid and firm assembly, such spacers being out of contact with the active rectifier surface and hence incapable of causing damage to said active surface. It is further within my contemplation, in connection with this aspect of the invention, to enable the said conductive elements effectively to establish contact with the plates by gentle and yieldable pressure, so as to eliminate the danger of mutilation of the plate surfaces.

It is also an object of my invention to provide spacer elements between adjacent plates which, without the use of fins or other complicated heat-radiating elements, will present ample space for effective ventilation of the unit. And in this aspect of my invention it is a further objective to enable said spacer elements to serve their intended functions without interference by and in cooperation with the said conductive elements.

And it is my objective to provide readily fabricated spring conductors and insulating spacers, which are adapted for ready assembly in a rectifier stack.

Other objects, features and advantages will appear from the drawings and the description hereinafter given.

Referring to the drawings.

Figure 2:
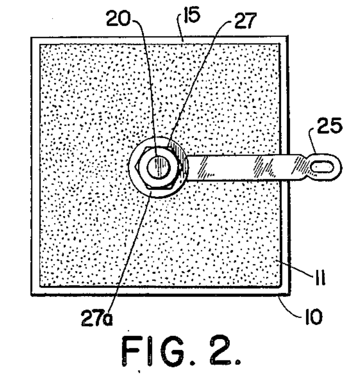
Fig. 2 is a top view of Fig. 1.

In the drawings, each rectifier plate 10 has on one surface thereof the coating 11, which may consist of a layer of selenium crystals with overlying layers of a barrier material and a low-melting point metallic electrode, the undersurface 12 being of the base material of the plate, such as aluminum. In this specification surface 11 is referred to as an "active" coated surface. The plate 10 has a central aperture 13 therein surrounded by a centrally disposed uncoated annular surface 14 of the plate, the marginal portion 15 thereof being also uncoated.

Figure 7:
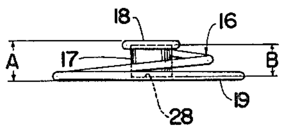
Fig. 7 is a front elevation of the coil of Fig. 6 and a spacer member, showing the relationship of these two members when the coil is in its normal unstrained condition.
Figure 8:
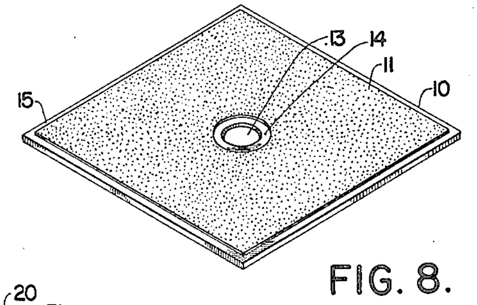
Fig. 8 is a perspective view of one of the rectifier plates shown in the above figures.

Said plates 10 are used combinatively with the conductive spring coils 16 and the spacer members 17 of electrically insulating material. In the preferred form of my invention, each of said coils 16 is of helical configuration—in the form of a helical spiral with terminal convolutions 18 and 19 of different diameters. In the embodiment illustrated, the upper terminal convolution 18 is smaller than the lower terminal convolution 19—convolution 18 being preferably proportioned for embracing engagement with the outer lateral surface of a coacting spacer member 17, which is preferably a cylindrical tube. It is also preferred that said upper and lower convolutions 18 and 19, respectively, each be substantially a full circle of 360 degrees, each being in one plane so that they will bear fully against the flat adjacent surfaces of the opposing faces of coacting flanking plates. It is also preferred that when each of the coils 16 is in its unstrained condition, as illustrated in Fig. 7, its height A with be somewhat greater than the height B of the spacer 17, for reasons which will more clearly hereinafter appear.

Figure 4:
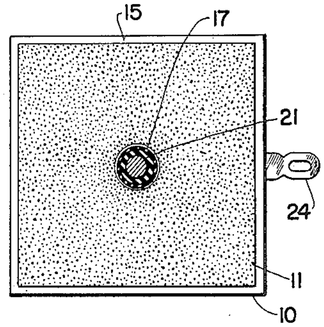
Fig. 4 is a section of Fig. 1 taken substantially along line 4—4.
Figure 3:
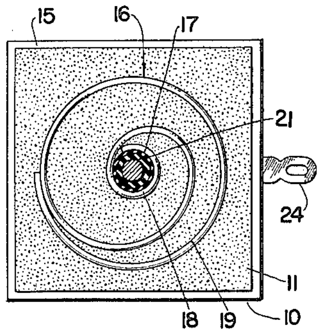
Fig. 3 is a section of Fig. 1 taken substantially along line 3—3.
Figure 1:
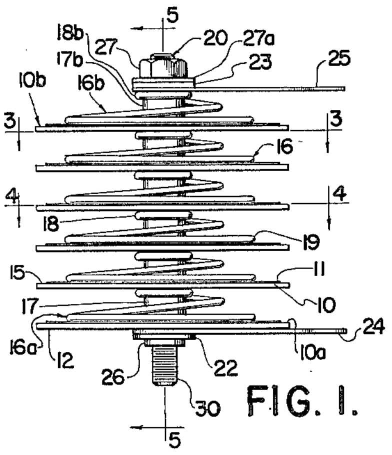
Fig. 1 is a sectional elevation of a rectifier stack in accordance with a preferred form of my invention.
Figure 5:
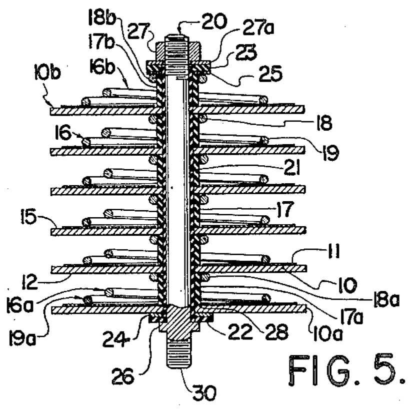
Fig. 5 is a section of Fig. 1 taken substantially along line 5—5, fragments being shown in elevation for clarity.

In creating a rectifier stack according to the preferred form of my invention, I employ a plurality of plates 10, coils 16 and spacer members 17, a top and bottom threaded stud 20, an insulating tube 21, insulating washers 22 and 23, terminal lugs 24 and 25, and nut 27. The said stud 20 is inserted through said tube 21, the latter resting upon the flange 26 forming an integral part of the said stud. The washer 22 and then the lug 24 are successively placed over said tube 21 and positioned at the lower portion of the stud, the washer 22 resting upon the flange 26. The lowermost plate 10*a* is positioned over the tube 21 and slid downwardly, said aperture 13 thereof being proportioned for a slide fit over said tube. The said active surface 11, in the form illustrated, faces upwardly, and all the other plates of the stack have their active surfaces correspondingly positioned. The bottom coil 16*a* is then positioned upon plate 10*a*, the bottom convolution 19*a* being in engagement with said active surface thereof. The bottom spacer member 17*a* is now passed downwardly over the tube 21, the internal diameter of said spacer member being proportioned for a slide fit over the outer surface of said tube 21. As illustrated, said spacer member 17*a* fits within the upper convolution 18*a* of the coil 16*a*, it being preferred, as aforesaid, that said convolution 18*a* be in embracing engagement with the outer lateral surface of the spacer member 17*a*. The uncoated annular margin 14 is proportioned so that its outer diameter is greater than the outer diameter of the cylindrical spacer member 17. The arrangement is hence such that the bottom edge 28 of the spacer member is entirely confined within the said annular surface 14, and is not in contact or bearing engagement with any portion of the active surface 11 (see Fig. 4).

The plates 10, coils 16 and spacer members 17 are now successively assembled in the manner hereinabove described with reference to plate 10*a*, coil 16*a* and spacer member 17*a*—the topmost plate being identified by the reference numeral 10*b*. Positioned over said plate 10*b* is the coil 16*b* and the top spacer member 17*b*, the lug 25 being disposed over the top convolution 18*b* of the latter coil. Insulating washer 23 is then positioned over the upper portions of the tube 21 and stud 20 above lug 25, whereafter the lock washer 27*a* and the nut 27 are positioned upon the upper threaded portion 29 of the stud.

To complete the assembly, the said nut 27 is tightened, thereby bearing down upon washers 27*a* and 23, and upon all of the parts therebelow. This causes a slight compression of all the coils 16, whereby firm contact is established between the said coils and the coacting electrodes comprising the opposing surfaces 11 and 12 of adjacent plates . The turning action of said nut 27 is continued until a rigid assembly is obtained by virtue of the resultant binding action between the rigid spacer members 17 and the respective opposing surfaces of the respective adjacent plates 10. When this is completed, the lower threaded section 30 of the stud is inserted in any suitable base adapted to support the structure. The lugs 24 and 25 are adapted and positioned to receive suitable leads, in well-known manner.

Inasmuch as the spacer members 17 are not in contact with the active surfaces 11, no damage whatsoever will be done to the plates regardless of the tightening pressure applied by the turning action of nut 27. Hence, as distinguished from conventional center-hole plate structures, rigidity of structure is effected without reducing the efficiency of the unit by mutilating the selenium or other active layer. Because of the fact that said spacer members 17 are separate and independent units, the stress induced therein under compression has no affect upon the spring conductor coils 16, the activating pressure merely causing a slight compression of said coils, whereby they exert a slight yieldable pressure against the opposing surfaces of the plates. Since the height B of each spacer member 17 is slightly less than the height A of the unstrained spring coils 16, the yieldable pressure exerted by the large lower convolution 19 of each of the coils upon the active surface 11 is not of a magnitude sufficient to cause damage to such surface. This is to be distinguished from conventional structures in which the spacer members are also the conductor members, so that a tightening of the assembly to obtain a rigid structure frequently causes unduly large strains within the coil, with consequent damage to the active rectifier surfaces engaged thereby.

In view of the firm yieldable engagement between the said conductor coils 16 and the opposing electrodes, firm electrical contact is established, as aforesaid. This fact, together with the fact that the lower terminal convolution 19 presents a comparatively large contact area with the underlying active surface 11, results in a relatively low intensity of heat generated at such area upon the operative passage of a current through the device. Moreover, the helical wire coil 16 is of open construction, thereby permitting the circulation of air therethrough and the consequent rapid dissipation of any heat generated. Accordingly, the entire structure is maintained in a relatively cool condition.

Modern fabricating methods make it possible to produce insulating tubes 21 and insulating spacer members 17 of relatively thin material; and the coils 16 may also be of relatively thin material, consistent with the light tension requirements of the spring coils and their current-carrying capacity. It is thus evident that a structure comparatively light in weight is obtainable with my invention.

It is also apparent that all the components hereinabove described are relatively simple and easy to fabricate, particularly since there are no complex heat radiating structures that need be employed therewith, whereupon a comparatively low-cost structure is obtained.

Figure 9:
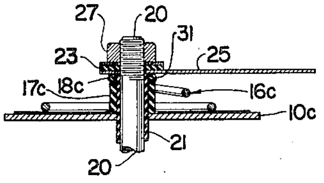
Fig. 9 is a fragmentary vertical central section of a modification of my invention.
Figure 6:
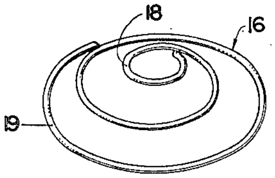
Fig. 6 is a perspective view of one of the conductive spring coils shown in the above figures.

In the modification of my invention shown in Fig. 9, the spring coil 16*c*, resting upon the plate 10*c*, has an upper convolution 18*c* proportioned for embracing engagement with the lateral surface of the tube 21, said convolution 18*c* being disposed upon the upper edge 31 of the spacer member 17*c*, the lug 25 being disposed over and in contact with said convolution 18*c*. Aside from the slight structural difference between this form and that first above described, their operations and effectiveness are the same.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a rectifier device, a rectifier plate with an active coated surface on one face thereof, a helical spring coil of conductive material having two opposite terminal convolutions, one of said convolutions being in yieldable engagement with said active surface, a conductor member in spaced relation to said plate and in yieldable engagement with the other of said convolutions, a second conductor member in engagement with the face of the plate opposite the coated face thereof, and spacer means between and in engagement with said plate and said first-mentioned conductor member.

2. In a rectifier device, a rectifier plate with an active coated surface on one face thereof, a spring coil of conductive material and of spiral helical form with respective large and small terminal convolutions, the said large convolution being in yieldable engagement with said active surface, a conductor member in spaced relation to said plate and in yieldable engagement with the said small convolution, a second conductor member in engagement with the face of the plate opposite the coated face thereof, and spacer means between and in engagement with said plate and said first-mentioned conductor member.

3. In a rectifier device, a rectifier plate with an active coated surface on one face thereof, a central uncoated surface on the same face thereof, a helical spring coil of conductive material having two opposite terminal convolutions, one of said convolutions being in yieldable engagement with said active surface, a conductor member in spaced relation to said plate and in yieldable engagement with the other of said convolutions, a second conductor member in engagement with the face of the plate opposite the coated face thereof, and spacer means between and in engagement with said uncoated surface and said first-mentioned conductor member.

4. In a rectifier device, an upper and a lower rectifier plate in spaced relation, each with an active coated surface on the upper face thereof and having an uncoated surface surrounded by said coated surface, both of said upper faces being disposed in the same direction, a spring coil of conductive material and of spiral helical form with respective large and small terminal convolutions, the said large convolution being in yieldable engagement with the said coated surface of the lower plate, the said small convolution being in yieldable engagement with the undersurface of the said upper plate, and a spacer member between said plates and in pressing engagement with said undersurface of the upper plate and only with said uncoated surface of said lower plate.

5. In a rectifier device, an upper and a lower rectifier plate in spaced relation, each with a central hole therein and having an active coated surface on the upper face thereof and an annular uncoated surface surrounding said hole, both of said upper faces being disposed in the same direction, a helical spring coil of conductive material having two opposite terminal convolutions, one of said convolutions being in yieldable engagement with said coated surface of the lower plate, the other of said convolutions being in engagement with the undersurface of said upper plate, and a spacer member between said plates and in pressing engagement with said undersurface of the upper plate and only with said uncoated surface of said lower plate.

6. In a rectifier device, an upper and a lower rectifier plate in spaced relation, each with a central hole therein and having an active coated surface on the upper face thereof and an annular uncoated surface surrounding said hole, both of said upper faces being disposed in the same direction, a spring coil of conductive material and of spiral helical form with respective large and small terminal convolutions, the said large convolution being in yieldable engagement with the said coated surface of the lower plate, the said small convolution being in yieldable engagement with the undersurface of the said upper plate, and a tubular spacer member of insulating material between said plates and in pressing engagement with said undersurface of the upper plate and only with said uncoated surface of said lower plate.

7. In a rectifier device, the combination according to claim 5, the height of said coil when in its normal uncompressed position being greater than the height of said spacer member.

8. In a rectifier stack, a plurality of spaced rectifier plates each with an active coated surface on one face thereof, all of said coated surfaces facing in the same direction, a plurality of helical spring coils disposed between and in yieldable engagement with opposing surfaces of said respective plates, separate spacer members between and in engagement with opposing surfaces of said respective plates, and holder means for said plates and spacer members, said latter means having members in pressing engagement with the respective outer surfaces of the upper and lower of said plates, whereby said coils and spacer members are maintained in operative engagement with adjacent plates.

9. In a rectifier stack, a plurality of spaced rectifier plates each with a central hole therein and having an active coated surface on the upper face thereof and an annular uncoated surface surrounding said hole, all of said upper faces being disposed in the same direction, a plurality of helical spring coils disposed between and in yieldable engagement with opposing surfaces of said respective plates, each of said coils being of spiral helical form with respective large and small terminal convolutions, the said large convolution being in yieldable engagement with the coated surface of the underlying plate, the said small convolution being in yieldable engagement with the undersurface of the overlying plate, a plurality of separate tubular spacer members of insulating material between and in pressing engagement with the respective undersurfaces of respective adjacent overlying plates and only with the said respective uncoated surfaces of respective adjacent underlying plates, and holder means having members in pressing engagement with the respective outer surfaces of the upper and lower of said plates, whereby said coils and spacer members are maintained in operative engagement with adjacent plates.

10. In a rectifier device, the combination according to claim 9, all of said spacer members being in registry, an insulating tube extending through all of said spacer members, a stud extending through said last-mentioned insulating tube, a top conductive spring coil disposed upon the uppermost of said plates, a top spacer member disposed upon said uppermost plate and within said coil, a terminal lug resting on said top spacer member, said top coil being in yieldable engagement with said lug, and locking means supported by said stud and in pressing engagement with said lug.

11. In a rectifier device, the combination according to claim 9, all of said spacer members being in registry, an insulating tube extending through all of said spacer members, a stud extending through said last-mentioned insulating tube, a top spacer member disposed upon the uppermost of said plates, a top conductive spring coil disposed about said spacer member and resting upon said uppermost plate, said coil having a top convolution disposed upon the upper edge of said top spacer member, a terminal lug resting on said top convolution, and locking means supported by said stud and in pressing engagement with said lug.

References Cited in the file of this patent

UNITED STATES PATENTS

| | | |
|---|---|---|
| 1,908,800 | Utne | May 16, 1933 |
| 2,345,122 | Herrmann | Mar. 28, 1944 |
| 2,454,846 | Skinker | Nov. 30, 1948 |
| 2,517,602 | Richards et al. | Aug. 8, 1950 |